United States Patent
Dunham et al.

(10) Patent No.: US 6,714,952 B2
(45) Date of Patent: Mar. 30, 2004

(54) METHOD FOR BACKUP AND RESTORE OF A MULTI-LINGUAL NETWORK FILE SERVER

(75) Inventors: Scott Dunham, Billerica, MA (US); Rulian Fiske, Wayland, MA (US); Hal Hansen, Tewksbury, MA (US); Sanjay Jain, Shrewsbury, MA (US); Madhav Mutalik, Southboro, MA (US); Edgar St. Pierre, Fall River, MA (US); Puneet Lal, Shrewsbury, MA (US); Uresh Vahalia, Waban, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/438,137

(22) Filed: Nov. 10, 1999

(65) Prior Publication Data

US 2002/0091710 A1 Jul. 11, 2002

(51) Int. Cl.[7] .............................................. G06F 12/00
(52) U.S. Cl. ........................ 707/204; 707/10; 711/161; 711/162
(58) Field of Search .................. 707/1, 8, 10, 100, 707/104.1, 200–204; 709/203, 217–219, 223, 226; 711/161, 162; 714/1, 2, 4, 6, 11, 13, 15

(56) References Cited

U.S. PATENT DOCUMENTS

| | | | | |
|---|---|---|---|---|
| 4,999,806 A | * | 3/1991 | Chernow et al. | 705/53 |
| 5,175,852 A | * | 12/1992 | Johnson et al. | 707/8 |
| 5,276,867 A | * | 1/1994 | Kenley et al. | 707/204 |
| 5,596,744 A | * | 1/1997 | Dao et al. | 707/10 |
| 5,644,766 A | * | 7/1997 | Coy et al. | 707/204 |
| 5,713,024 A | * | 1/1998 | Halladay | 714/13 |
| 5,751,997 A | * | 5/1998 | Kullick et al. | 709/215 |
| 5,832,498 A | * | 11/1998 | Exertier | 707/103 R |
| 5,832,501 A | * | 11/1998 | Kain et al. | 707/1 |
| 5,915,253 A | * | 6/1999 | Christiansen | 706/47 |
| 5,926,819 A | * | 7/1999 | Doo et al. | 707/100 |
| 6,041,344 A | * | 3/2000 | Bodamer et al. | 709/203 |
| 6,044,205 A | * | 3/2000 | Reed et al. | 707/1 |
| 6,119,118 A | * | 9/2000 | Kain et al. | 707/1 |
| 6,128,621 A | * | 10/2000 | Weisz | 707/101 |
| 6,144,969 A | * | 11/2000 | Inokuchi et al. | 707/200 |
| 6,161,109 A | * | 12/2000 | Matamoros et al. | 707/101 |
| 6,161,111 A | * | 12/2000 | Mutalik et al. | 705/42 |
| 6,173,317 B1 | * | 1/2001 | Chaddha et al. | 709/219 |
| 6,173,374 B1 | * | 1/2001 | Heil et al. | 709/212 |
| 6,260,069 B1 | * | 7/2001 | Anglin | 707/204 |
| 6,295,538 B1 | * | 9/2001 | Cooper et al. | 345/467 |
| 6,298,425 B1 | * | 10/2001 | Whitaker et al. | 707/204 |
| 6,314,476 B1 | * | 11/2001 | Ohara | 709/202 |
| 6,324,547 B1 | * | 11/2001 | Lennert et al. | 379/242 |
| 6,324,581 B1 | * | 11/2001 | Xu et al. | 707/10 |
| 6,339,793 B1 | * | 1/2002 | Bostian et al. | 707/10 |
| 6,549,918 B1 | * | 4/2003 | Probert, Jr. et al. | 707/203 |
| 2001/0047460 A1 | * | 11/2001 | Kobayashi et al. | 711/162 |

OTHER PUBLICATIONS

Burgener, Eric, "Storage area networks", Jan. 1999, UNIX Review's Performance Computing, v17n1, pp. 31–38.*

System Administrator's Guide (Celerra File Server Manager), V 2.0 EMC Part No. 300–500–559, Revision A, printed 3/99 Chapter 5.5.

* cited by examiner

Primary Examiner—Greta Robinson
Assistant Examiner—Harold E. Dodds, Jr.
(74) Attorney, Agent, or Firm—Choate, Hall & Stewart

(57) ABSTRACT

Described is a technique for a backup and restoration of data in a network that includes a multi-lingual file system and a multi-lingual network file server. Multiple meta data files are associated with a single data file in the network. Provided are services for packaging the metadata as a single parameter of an application programming interface (API) for a particular data file being backed up or restored over a network. These techniques may be used in both full and incremental backups and restores of data over a network.

75 Claims, 10 Drawing Sheets

```
Status = GetCelerraFSHandle(char *pathname, int *version, void **fshandlep)
``` pathname   (input)    this is a pointer to a null-terminated string which
                      references a file or directory within the Celerra mounted
                      uxfs filesystem of interest. If the filesystem is not
                      mounted on the host on which this API is running or it is
                      not exported from a Celerra server, this call will fail.

version    (output)   this is a pointer to an integer set by the API which
                      represents the version of this CIFS filesystem. A zero
                      version specifies that this filesystem does not support
                      CIFS.

fshandlep  (output)   on return, this contains a pointer to a handle set by
                      the API which is used to reference the Celerra uxfs
                      filesystem in subsequent calls to this API.

status     (return)   this is an integer returned by the API which represents
                      the success or failure of the API call.

FIG. 7

```
Status = GetCelerraFileStat(void *fshandlep, char *pathname, struct celerra_attr_list **attrs)
``` fshandlep   (input)    this is a pointer previously returned by a
                       GetCelerraFSHandle() call which is used to reference a
                       particular Celerra uxfs filesystem.

pathname    (input)    this is a pointer to a null-terminated string which
                       references a uxfs file or directory within the Celerra
                       mounted filesystem referenced by fshandle.

attrs       (output)   this is a pointer to a pointer that is set to a
                       Celerra attribute structure. This structure is
                       allocated and filled by the API and represents the
                       known file attributes of pathname in an array of
                       name/value pairs. This must be deallocated by the
                       FreeCelerraAttr() call.

status      (return)   this is an integer returned by the API which
                       represents the success or failure of the API call.

FIG. 8

```
Status = SetCelerraFileStat(void *fshandlep, char *pathname, struct celerra_attr_list **attrs)
```

| | | |
|---|---|---|
| fshandlep | (input) | this is a pointer previously returned by a GetCelerraFSHandle() call which is used to reference a particular Celerra filesystem. |
| pathname | (input) | this is a pointer to a null-terminated string which references a uxfs file or directory within the Celerra mounted filesystem referenced by fshandle. |
| attrs | (input) | this is a pointer a Celerra attribute structure that is used to set the file attributes of the file or directory referenced by pathname in the filesystem, further referenced by fshandle. |
| status | (return) | this is an integer returned by the API which represents the success or failure of the API call. |

154 ⟶
Status = FreeCelerraAttr(struct celerra_attr_list *attrs) ⟵ 152 attrs    (input)   this is a pointer a Celerra attribute structure that
                   was previously allocated by GetCelerraFileStat().

status   (return)  this is an integer returned by the API which
                   represents the success or failure of the API call.

164 ⟶
Status = FreeCelerraFSHandle(void *fshandlep) ⟵ 162 fshandlep (input)  this is a pointer previously returned by the
                   GetCelerraFSHandle() API call that references a
                   Celerra uxfs filesystem.

status    (return) this is an integer returned by the API which
                   represents the success or failure of the API call.

FIG. 11

METHOD FOR BACKUP AND RESTORE OF A MULTI-LINGUAL NETWORK FILE SERVER

BACKGROUND OF THE INVENTION

1. Field of the Invention

The invention generally relates to systems and methods executed in a computer system utilizing file system attributes in a multi-lingual file system environment, and more particularly to systems and methods for utilizing file system attributes in a multi-lingual file system environment when performing backup and restoration of data.

2. Description of Related Art

Generally, computer systems may be used in a variety of applications for providing and maintaining data in both local and remote computer systems connected in a network. Each computer system in a network may access data in accordance with one of a variety of different data formats and attributes that may vary with the file system, for example, on each computer system. Computers, as may be connected in a network, generally require backup of data on the various computer systems connected to a network. Similarly, a restore operation may be required in various applications of data that have been previously backed up. For example, there may be a backup of data in a computer system at a first point in time. This backed up data may be stored in some type of archive or backup data storage area. In the event of a system failure or disk corruption, for example, this data may need to be restored. As a result, the backup and restoration of data may be operations typically executed within a computer system, in more particularly within a network with one or more computer systems connected via the network.

Many existing systems have a variety of connections, network topologies and hardware and software configurations within which the backup and restoration of data may be performed. In one arrangement of a network, there exists multiple storage devices that may be accessed by one or more remotely connected computer systems in the network. One type of backup strategy provides for a local backup of the multiple storage devices. However, this may be a problem for backup strategy as well as the restoration strategy if remote backup and restoration of data stored in the network is required. Thus, it may be desired to have a remote backup and restoration capabilities for data within a network of a computer system.

In a second strategy, remote backup and restoration capabilities are provided by having the backup and restore operations performed from a single point within the network. With a common storage area of multiple storage devices, one problem becomes how to interpret the various data formats which may be stored in a common or mass storage. For example, multiple computer systems may store data in the common storage area in multiple formats. Thus, in order to store and retrieve data in the various formats, software is required to execute as part of the backup and restoration operations which understands and can interpret the different file formats. This may be a problem in that the system designated as performing the backup and restoration of the data as a single point is required to interpret all of the different data formats. One way around this problem is to have each of the different computer systems to perform the different interpretation of the data to be backed up and restored from the single point in a network used for the backup and restoration of data. For example, the computer system that performs the backup and restoration may interact with software on a designated computer system to interpret data which is being backed up from a mass storage device. However, this has a drawback of requiring agent software running on each of the different host systems to backup and restore data as well as coordinate activities with the computer system serving as the single point for data backup and restoration.

Additionally, a data synchronization strategy is required among multiple hosts which may access a common file or other storage location, for example, to determine what is the most recent version of the data being backed up. This problem may be additionally compounded, for example, when each of the different computer systems interpret commonly accessed data files in different data formats.

It should be noted that a particular interpretation of the file data may be represented as metadata. Generally, metadata describes one point of view or interpretation of file data in accordance with, for example, one particular file system. Metadata includes file attributes describing a particular set of file data. Examples of metadata may include, for example, file size, record size, date information, edit history or modification information associated with the file data, and user access information. Two file systems may each have different metadata of file attributes associated with the same set of file data. A device that provides the service to access the same set of file data from multiple file system perspectives may be referred to as a multilingual file server.

Thus, what is desired is an efficient and flexible technique for providing backup and restoration of data among multiple computer systems accessing a common set of data in a variety of different data formats.

SUMMARY OF THE INVENTION

In accordance with principles of the invention is a method and a system for providing one or more metadata files associated with a data file in a network. A request is issued by a client for the data file and the one or more metadata files from a file storage area. A file server obtains each of the one or more metadata files. In response to the request, the one or more metadata files are provided to said client in a single response. The foregoing issuing, obtaining and providing are performed using remote procedure calls between the client and the file server.

In accordance with another aspect of the invention is a method and a system for performing a data backup operation in a network. A request is received at a backup server to backup data from a storage area. In response to the request, a data file is transferred to the backup server from a file server. Using a single remote procedure call, one or more metadata files corresponding to the data file are transferred. Each of the metadata files describes the data file in a different file system included in the network.

In accordance with yet another aspect of the invention is a method and a system for performing a data restoration operation in a network. A request is received by a backup server for restoration of a data file from a backup storage area. The data file is transferred to a target location in which the target location is at a network location different from the backup storage area. One or more metadata files associated with the data file are transferred from the backup storage area in a single message using remote procedure calls to the target location.

In accordance with yet another aspect of the invention is a system for performing a remote backup operation in a network. At least two computer systems are included in the network in which each of said computer systems has a different file system. A backup computer system performs backup data operations and has a backup storage device. A backup agent included in the backup computer system controls data backup operations and issues remote procedure call requests to obtain a data file to be backed up to the backup storage device. A file server system provides data to be backed up to the backup computer system. A metadata service included in the file server system responds using remote procedure calls to requests from the backup agent for metadata. The metadata service provides at least two metadata files for a data file being backed up as a parameter included in a first of the remote procedure calls. Each of the two metadata files includes file attributes corresponding to a different file system used by one of the at least two computer systems. A network connection between the backup agent and the metadata service transmits the at least two metadata files.

In accordance with yet another aspect of the invention is a system for performing a remote data restoration operation in a network. At least two computer systems are included in the network. Each of the computer systems has a different file system. A backup computer system performs data restoration operations and has a backup storage device. A restore agent is included in the backup computer system for controlling data restoration operations and issuing remote procedure calls to transmit a data file to be restored to a target location. The restore agent provides at least two metadata files for a data file being restored as a parameter included in a first of the remote procedure calls. Each of the two metadata files includes file attributes corresponding to a different file system used by one of the at least two computer systems. A metadata service is included in the target location for interfacing with the restore agent to receive data transmitted from the restore agent. A network connection exists between the restore agent and the metadata service for transmitting the at least two metadata files.

BRIEF DESCRIPTION OF THE DRAWINGS

Features and advantages of the present invention will become more apparent from the following detailed description of exemplary embodiments thereof, taken in conjunction with the accompanying drawings, in which:

FIGS. 7–11 are example embodiments of application programming interface (API) calls that may be used in the system of FIG. 1 to perform backup and restoration data operations.

DETAILED DESCRIPTION OF PREFERRED EMBODIMENT

Figure 1:
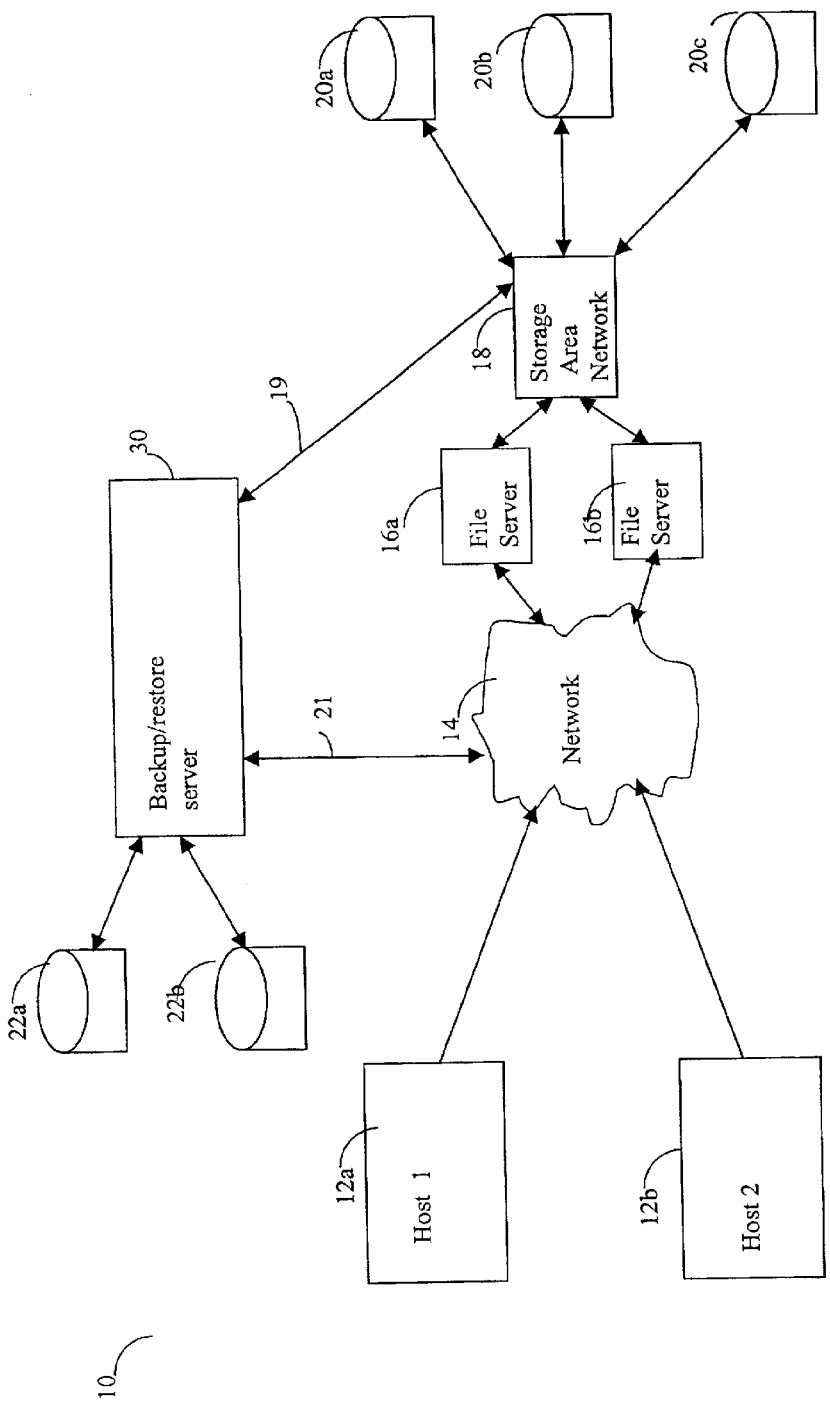
FIG. 1 is an example of an embodiment of a system that uses the present invention.

Referring now to FIG. 1, shown is an example of a system that uses the present invention. The system 10 of FIG. 1 includes host systems 12a and 12b which communicate via network 14 to the backup restore server 30 and multiple file servers 16a and 16b. The backup/restore server 30 may include multiple backup storage locations, such as 22a and 22b, for storing data. The backup/restore server is connected to the network 14 via communication connection 21. The backup restore/server 30 is also connected to a storage area network (SAN) via direct connection 19. File servers 16a and 16b are connected to the SAN 18 which controls access to various storage devices 20a–20c upon which different hosts, such as 12a and 12b, may store various forms of data.

It should be noted that the backup/restore server 30 may or may not be connected to a SAN. Although FIG. 1 shows connection 19, another embodiment may not include connection 19. Rather, in this other embodiment without connection 19, all communications between the backup/restore server 30 and the SAN 18 use connection 21. Techniques using connection 19, or alternatively connection 21, are described in more detail in paragraphs that follow.

In this particular embodiment, each of the hosts 12a and 12b may be any type of commercially available processor executing any one of a variety of commercially available or proprietary operating systems and associated software. For example, host 12a may be a commercially available processor running software supporting the NFS file system. The second host 12b may be another commercially available processor running a different file system, such as the commercially available NT file system by Microsoft™, or the CIFS (Common Internet File System) also by Microsoft™. Generally, CIFS is a commercially available networked file system. In this embodiment, hosts 12a and 12b may have a native Unix or NT file system, but use the networked file systems, for example such as CIFS or NFS, included in networked file servers 16a and 16b.

In this particular embodiment, each of the hosts 12a and 12b may access and store data on the storage devices 20a–20c in a variety of data formats in accordance with the different file systems on the different hosts 12a and 12b. The different data or file formats may provide different attributes, for example, for each of the files stored in the file system. Some of the attributes for the two file systems may be the same, and some may be different. For example, an access control list or ACL is available in the CIFS file system but not on the NFS file system. A file dating convention with regard to modification to the file is associated with both the NT and UNIX file systems. This is an example of attributes that may be common, such as the file dating, and others that may be unique to a file system, such as the ACL, in accordance with the different file systems that may be used in the system 10 of FIG. 1 on the hosts 12a and 12b.

The network 14 may be one of the variety of network types, such as a local area network or LAN. In this particular embodiment, each of the hosts 12a and 12b store data on the various storage devices 20a–20c using the network 14 to communicate with each of the file servers 16a and 16b to access the SAN that controls access to the different devices 20a–20c. The network file servers 16a and 16b may be, for example, the Celerra™ file server by EMC Corporation of Hopkington, Mass. Generally, a preferred embodiment may include other commercially available file servers providing the capabilities and functions associated with file input and output (I/O) operations for the various devices 20–20c connected via the SAN 18.

The SAN 18 is generally known to those skilled in the art for enabling direct high speed connections between various storage elements, such as 20a–20c, and various system components, such as the hosts 12a and 12b. Generally, connections such as 19 between the backup/restore server 30 and the SAN, as well as connections between each of the file servers 16a and 16b and the SAN may be in accordance with one of a variety of communications connections associated protocols. For example, the connection 19 may be a fibre channel (FC) or small computer system interconnect (SCSI) connection. Generally, one of the characteristics of the SAN is that it has no responsibility for interpreting data that is stored on the various devices 20a–20c.

In this embodiment, the SAN may be implemented as one or more commercially available EMC Symmetrix Enterprise Storage systems. It should be noted that these Symmetrix may or may not be organized in a SAN in an embodiment including the invention. One embodiment may have the one or more Symmetrix organized in a SAN interconnected, for example, by an EMC Connectrix fibre channel switch. In another embodiment, the one or more Symmetrix may be stand-alone connected only to the Celerra File Server, such as 16a and 16b.

Each of the storage devices 20a–20c may be one of a variety of different storage devices known to those skilled in the art. They may include, for example, a disk or magnetic tape, or a disk array, such as the Symmetrix™ ICDA™ manufactured by EMC Corporation.

It should be noted that other embodiments may include variations of the foregoing system and incorporate the present invention. For example, an alternate preferred embodiment using the invention may be have a different number of hosts rather than just two as shown in the existing system 10 of FIG. 1. Similarly, other preferred embodiments may include a different number of file servers than those shown in the system of FIG. 1.

Figure 2:
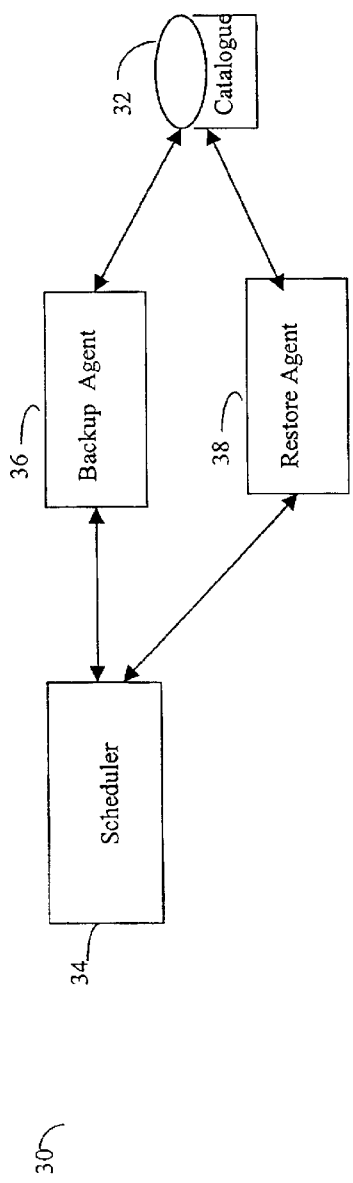
FIG. 2 is an example of an embodiment of software that may be included in the backup/restore server of FIG. 1.

Referring now to FIG. 2, shown is an example of the various software components that may be included in one embodiment of the backup/restore server 30 as included in the system 10 of FIG. 1. Shown in FIG. 2, is a scheduler 34 which communicates with the backup agent 36 and the restore agent 38. Each of the backup and restore agents 36 and 38 respectively, read and write information from a catalog file 32.

Generally, the backup/restore server 30 is a computer system which, in this particular embodiment, serves as a single point at which backup and restoration of data is performed with regard to backup storage devices 22a and 22b attached to the backup/restore server 30. Generally, the scheduler 34 schedules the different I/O operations performed as part of the backup and restoration of data on devices 22a and 22b. The backup agent 36 generally controls or drives the backup data operations, such as by initiating requests for file data and information retrieved from the file server 16a to perform backup data operations. Similarly, the restore agent 38 is the driver for any data restoration processes that may occur with regard to data stored on devices 22a and 22b. The backup agent 36 for example, as will be described in paragraphs that follow, is responsible for initiating network calls to obtain various file system information from the file server. Similarly, the restore agent 38 may make network calls as needed to the file servers 16a and 16b when performing data restoration operations.

The catalogue 32 is generally a description of the various files and associated attributes or metadata for each of the files included in backup storage devices 22a and 22b. Generally, the catalogue 32 may include, for example, different file names by which a single set of file data may be referred to in accordance with each of the hosts 12a and 12b. For example, if host 12a is an NT system and host 12b is a UNIX system, they may have different file naming conventions for referencing the same set of data. Both naming conventions referencing the same set of data may be included in the catalogue 32. Also, associated metadata or file attributes are included in the catalogue 32. Metadata or file attributes may include, for example, how the file may be accessed by various users, the date last modified, the number of file storage extents associated with this particular file, and the like.

As previously described, a metadata file describes data included in a file from the point of view of a particular file system of a particular host system, such as 12a. In other words, the same set of data may have multiple corresponding metadata files in accordance with the different files systems in each of the hosts systems such as 12a and 12b. Thus, when performing a backup of the data for a particular file, for example, which may be accessed by hosts 12a and host 12b, multiple metadata files may be associated with one single set of file data. Each of these metadata files may be backed up and restored in accordance with the operation being performed. The software components that are included in the backup restore server 30 as included in FIG. 2 may be included in products such as the EDM™(EMC Data Manager) line of products which are capable of data restoration and backup, as described in numerous publications available from EMC, including the EDM User Guide "Basic EDM Product Manual". In view of the foregoing description, an embodiment may include the backup agent and restore agent of the backup/restore server 30 as part of the EDM product. Accordingly, the backup/restore server 30 may be NFS attached or mounted to a Celerra file system of file servers 16a and 16b.

It should be noted that in this embodiment with regard to backup and restore operations that are described in paragraphs that follow, the backup agent 36 writes data to backup media, such as tape. Additionally, the restore agent 38 reads data from the backup media and writes the data, for example, to file server 16a or 16b.

It should be noted that other preferred embodiments may employ other backup and restoration software besides the EDM products in accordance with principles of the invention described herein.

Figure 3:
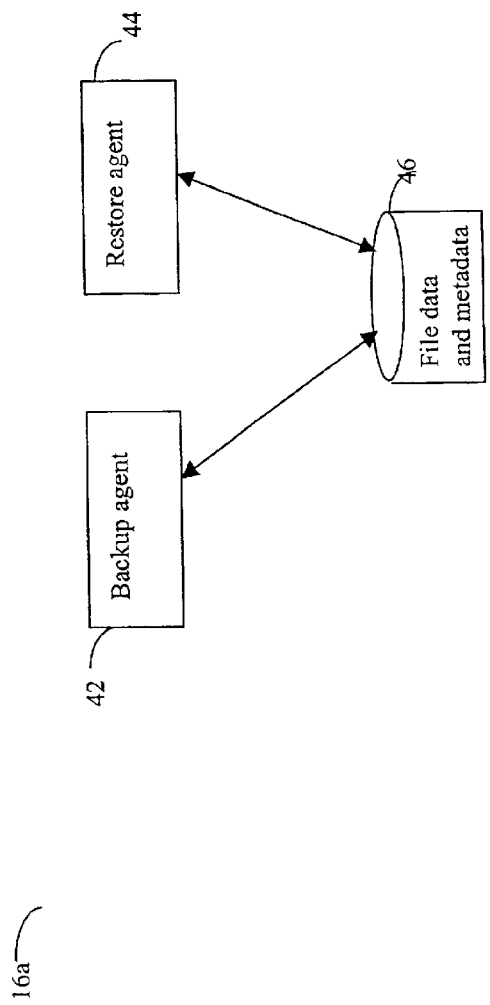
FIG. 3 is an example of an embodiment of software that may be included in the file server of FIG. 1 used in performing the backup and restoration of data.

Referring now to FIG. 3, shown is an example of the various software components that may be included in each of the file servers 16a and 16b for use in the backup and restoration processes when storing and retrieving data on the devices 20a–20c. Generally, the file system 42 and the metadata service 44 communicate with the backup agent 36 of FIG. 2 in performing the backup process and functions associated herewith. Similarly, these components of the file server generally communicate with the restore agent 38 of the backup/restore server, as previously described in conjunction with FIG. 2 when performing restore operations. Each of the file system 42 and the metadata service 44 as included in the file servers 16a and 16b may operate over the network 14 or using connection 19 to communicate with other components in the backup/restore server 30 when performing the backup and restoration operation.

The file data and metadata 46 included in FIG. 3 are shown for the sake of simplicity, without the file servers and other intervening components, as data collected from the devices 20a–20c, for example, when performing a backup. As will be described in paragraphs that follow, the file data and metadata 46 is a simplified version of the data which is sent via the file system 42 and the metadata service 44 to the backup/restore sever 30 when performing a backup of data. Similarly, when data and metadata are being restored, data and corresponding metadata are transmitted from the backup/restore server 30, respectively, to the file system 42 and the metadata service 44. Subsequently, the data and metadata are then stored on devices 20a–20c.

Generally, in this embodiment, the file system 42 may be used in data transmissions of the file data. Corresponding metadata that is also transmitted uses the metadata service 44. Functionally, the metadata service 44 provides for collecting and gathering the one or more sets of file attributes included in metadata associated with a single set of file data as included in this network supporting a multi-lingual file system with a multi-lingual file server. This will be described in more detail in following paragraphs.

As known to those skilled in the art, the various functions performed by the agents included in the backup/restore server and the metadata service may be implemented in one of a variety of different commercially available programming languages, such as the "C" and "C++" programming languages.

Figure 4:
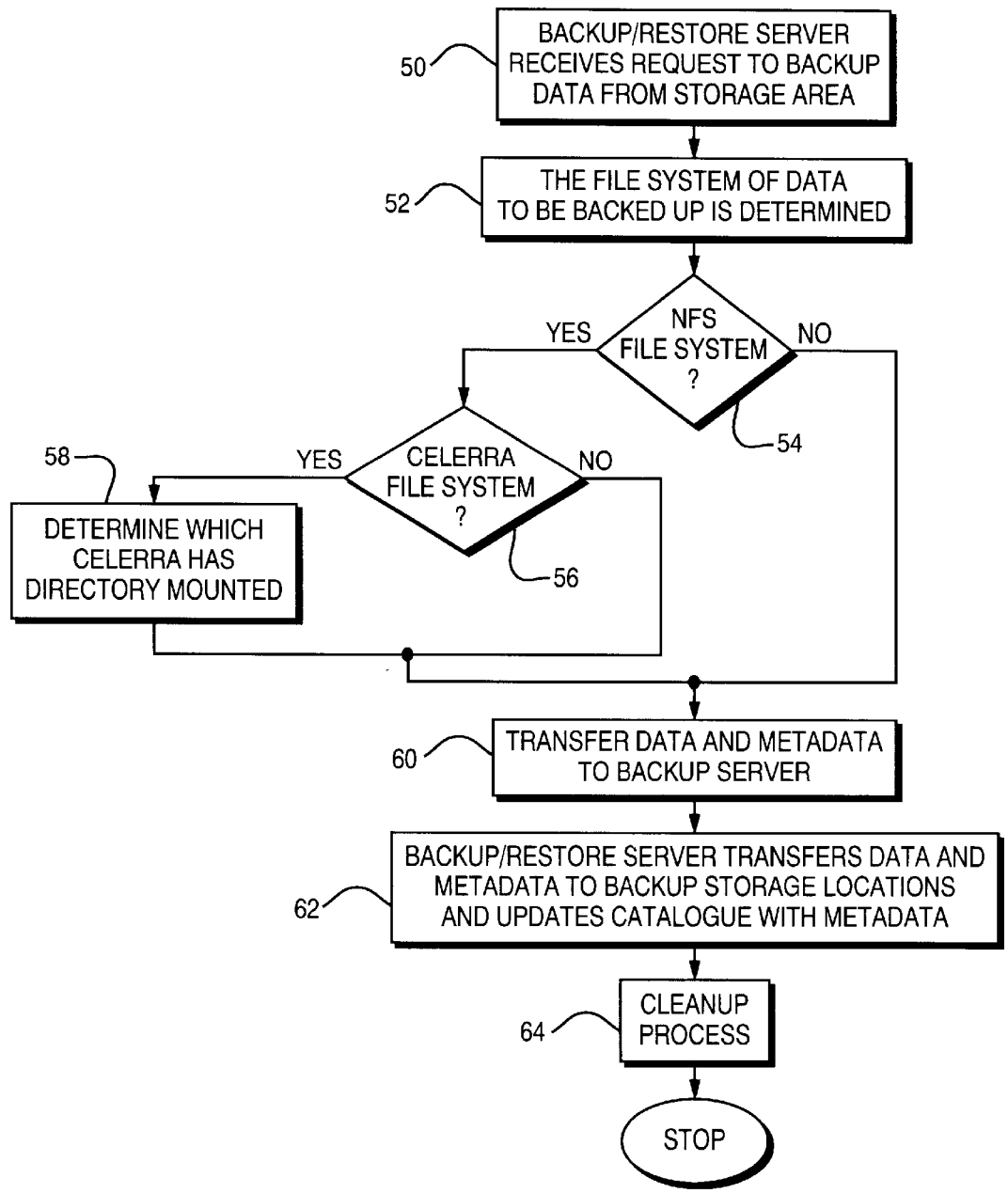
FIG. 4 is flowchart of an example of an embodiment of method steps for performing a backup of data.

Referring now to FIG. 4, shown is a flowchart of an example of an embodiment of the method steps as performed in a backup process for backing up data in a multi-lingual file server. At step 50, the backup/restore server 30 receives a request to backup data from a file server. Referring back to FIG. 1, data may be backed up, for example, from the devices 20a–20c. A request to backup data may be generated, for example, by someone who is an administrator on the backup/restore server when performing a full or incremental backup of the system. Additionally, a remote request from one of the hosts connected via network 14, such as 12a, may also initiate the request to backup data sent to the backup/restore server 30 at step 50. It should be noted that in this particular embodiment, the scheduler 34 receives the request.

At step 52, the file system from which data is to be backed up is determined. In this particular embodiment, an inquiry as to the file system residing on the file servers 16a and 16b may be obtained by performing a procedure call as may be provided by an operating system. An operating system call may be executed on the file server 16a to return information as to the type of file system of the file server 16a. A file system of the file server 16a may be, for example, the network file system (NFS), or a CIFS file system. Other types of file systems may also be possible in accordance with other embodiments of the invention.

At step 54, the determination is made as to whether the file system is an NFS file system. If a determination is made that the file system is an NFS file system, control proceeds to step 56 where an inquiry is made to whether this file system is a Celerra file system. If a determination is made at step 56 that this is a Celerra file system, control proceeds to step 58 where a determination is made as to which Celerra file server has the directory mounted for the data which is being backup. In other words, at step 58 a determination is made via an API call as to which file server, such as 16a or 16b, is to be accessed to locate the data to be backed up.

If it is not a Celerra file system, subsequent to step 56, control proceeds to step 60. Similarly, if it is determined at step 54 that it is not an NFS file system, control proceeds from step 54 to step 60. At step 60, the data and metadata for the files to be backed up are transferred from storage, such as from 20a–20c, to the backup/restore server. This may be done, for example, using remote procedure calls resulting in the transfer of data. At step 62, the backup server transfers the data and the metadata to the backup storage location and updates the catalogue with the appropriate metadata. It should be noted that the metadata may be stored only in the catalogue, or additionally copied with the actual data to the backup storage devices. At step 64, a clean up process may take place in accordance with each embodiment. For example, memory deallocation of various structures used in performing the backup of data may now be deallocated.

Figure 5:
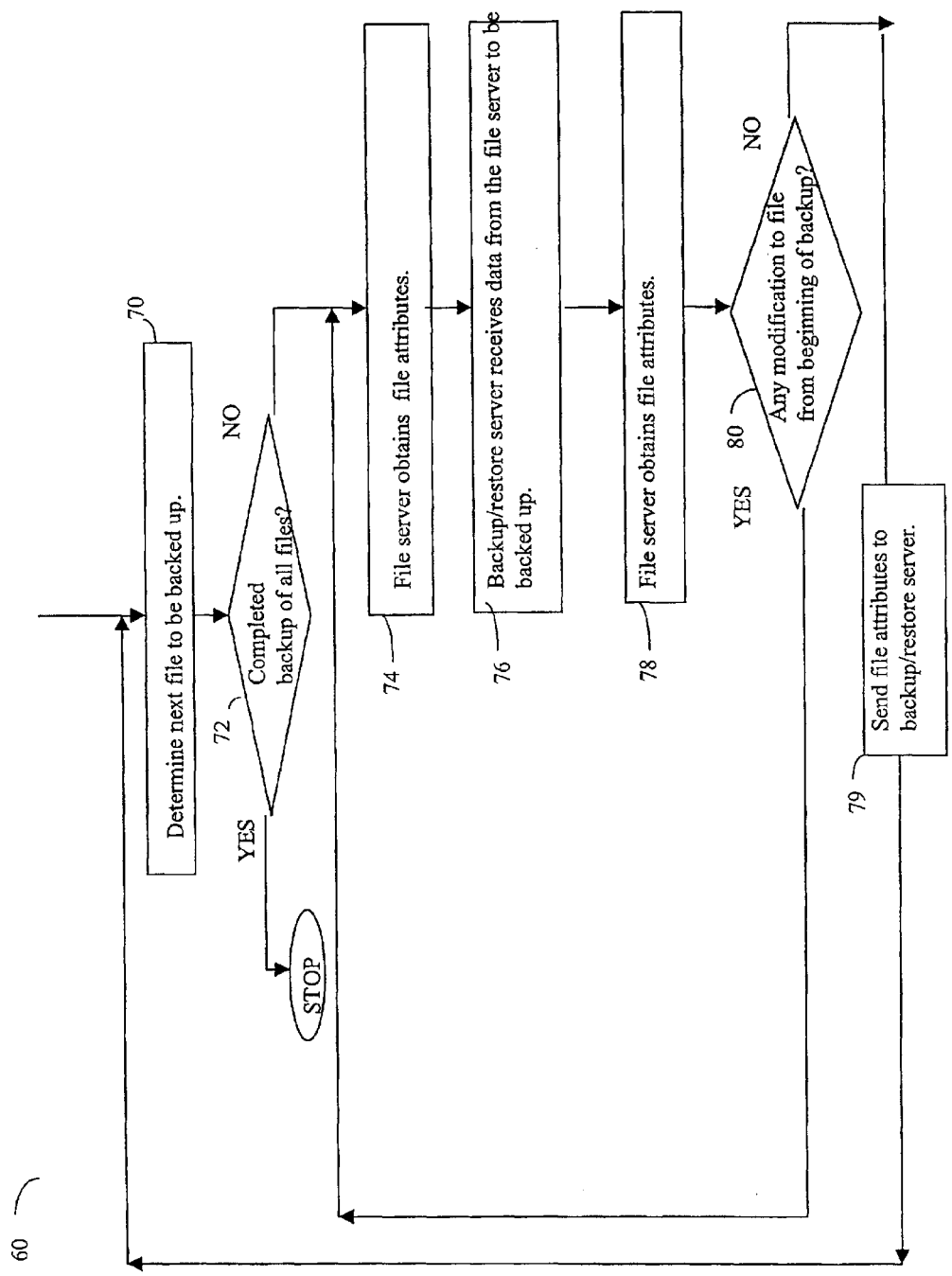
FIG. 5 is a flowchart of an example of an embodiment of steps showing more detailed of transferring data and metadata to the backup server from the method of the flowchart of FIG.

Various steps referred to in the flowchart of FIG. 4 will now be described in more detail. In particular, referring now to FIG. 5, shown in more detail is the step 60 of transferring the data and metadata to the backup server. Generally, the process of backing up the data and metadata in step 60 of FIG. 4 as set forth in FIG. 5 performs backup of data on a file by file basis. In this particular embodiment, these steps described in connection with FIG. 5 are performed by the backup agent 36 of the backup/restore server 30 of FIGS. 1 and 2.

At step 70, the next file in the data set to be backed up is determined. At step 72, a determination is made as to whether all of the files to be backed up are completed. If a determination is made at step 72 that backup operations are not completed, control proceeds to step 74 where the backup/restore server obtains file attributes from the file server for the file determined at step 70 to be backed up. These file attributes obtained at step 74 may be described as metadata associated with a particular data file. In this particular embodiment, there may be multiple metadata files associated with a particular data file. The multiple metadata files exist in this embodiment due to the different types of file systems that may exist in accordance with each of the different host systems 12a and 12b.

At step 74, the backup/restore server obtains file attributes from the file server. In this embodiment, these are obtained through the metadata service 44 that collects together the different metadata files. In other words, there may be multiple procedure calls and other operations performed by the metadata service 44 of the file server, such as 16a, to obtain the different metadata attributes. All of the file's metadata is returned to the backup/restore server 30 via network connection 21 or SAN connection 19 in accordance with the communications connections of a particular embodiment. This is described in more detail in paragraphs that follow.

At step 76, the backup/restore server reads the file data from the file server, such as 16a or 16b, for the file to be backed up. This is the actual data, as may be transmitted using the file system 42, rather than the metadata, as may be transmitted using the metadata service 44, associated with the particular file being backed up. It should be noted that at step 76 in this particular embodiment, the actual data may be transferred via a high-speed connection 19 between the SAN 18 and backup/restore server 30, or using data connection 21 through network 14 from the file server 16a. It should be noted that generally in this particular embodiment, the connection 19 is a high-speed data connection providing for quicker response time for the large amounts of data actually transmitted between the SAN 18 and the backup/restore server 30. Generally, the metadata files are smaller and may be transmitted via the network 14 using data connection 21. The high-speed connection 19 may not be used for the transfer of metadata in this particular embodiment because metadata is typically in smaller quantities and may be transmitted using network 14 rather than using the high-speed connection 19 due to the smaller quantity. Other variations of this embodiment may transmit both data and metadata using network 14 over connection 21. Similarly, another embodiment may also use just connection 19 to transmit data and metadata. This is in accordance with each particular embodiment as well as the amount of data and other requirements of each system embodying the principles of the invention described herein.

The data transfer connection 19 used for the backup and restoration of data from the SAN 18 in this particular embodiment may be, for example, a fibre channel (FC) or a SCSI connection as previously described. The data transfer means such as connection 19 may be independent of the file system, such as NFS or CIFS, which may reside on the file servers in the system 10 of FIG. 1. For example, products such as EDM's Symmetrix Path by EMC Corporation™ may be used for the directed transfer connections between the backup restorer server and the storage area network 18.

It should also be noted that step 76 may be performed as by backup agent 36 using file I/O operations, such as file open, read and close sequence of file I/O operations, to obtain the data for the particular file. In this particular embodiment, for example, if backup agent 36 of the backup/restore server performs an open, read and close sequence of I/O operations which are local I/O operations, data is read from the storage devices and then subsequently transferred via between the files server 16a and the backup/restore server 30. Alternatively, the backup agent 36 of the backup/restore server 30 may also issue these file I/O operations resulting in all of the actual file data associated with a file being transferred between the SAN and the backup/restore server 30.

At step 78, the file attributes are obtained by the backup/restore server a second time from the metadata service 44 of the file server. In this particular embodiment, the file attributes obtained at steps 74 and 78 are used in step 80 to determine if there has been any modification to the actual file data from the beginning of the backup. In other words, the attributes obtained at step 74 and at step 78 are compared at step 80 to determine if there has been any modification to the data which was read by the backup/restore server in step 76. This may be determined, for example, by examining the time last modified as obtained by the various file attributes.

If at step 80 a determination has been made that there has been a modification to the file data sent to the server at step 76 from the time that backup of the this file began, control proceeds to step 74 to repeat the backup process of this particular file. At step 80, if it is determined that there is no modification to the data sent at step 76 from the time when the backup process of this file began, control proceeds to step 79 where the file attributes or metadata files are stored in the backup/restore server's catalogue. Control proceeds to step 70, where the next file to be backed up is determined. This process of backing up each file proceeds until, at step 72, it has been determined that the backup process is complete.

Generally, with regard to the flowchart describing the method steps in the backup process of FIG. 5, one aspect of the backup process is to return multiple metadata or file attributes in accordance with different file systems associated with a particular data set or file in a single message, procedure call, and the like. When performing a backup, the different metadata file attributes are gathered and packaged together and forwarded by the file server via network 14 to the backup/restore server 30 through connection 21 in one particular embodiment. This provides for the backup of one set of data with multiple different metadata files associated with that particular data set.

The previously described technique provides transparency to the EDM backup agent 36 on the backup/restore server 30 when there are multiple metadata files for a single copy of data. With a consolidated operation, such as via a single API which will be described in the paragraphs that follow, the backup agent 36 located on the server 30 obtains all of the metadata. Additionally, as may be obtained with other file I/O operations, the associated file data which is being backup on a storage device such as 22a or 22b may be obtained. This backup strategy as provided by EDM provides for the backup for all of the data to a single point in a network.

Figure 6:
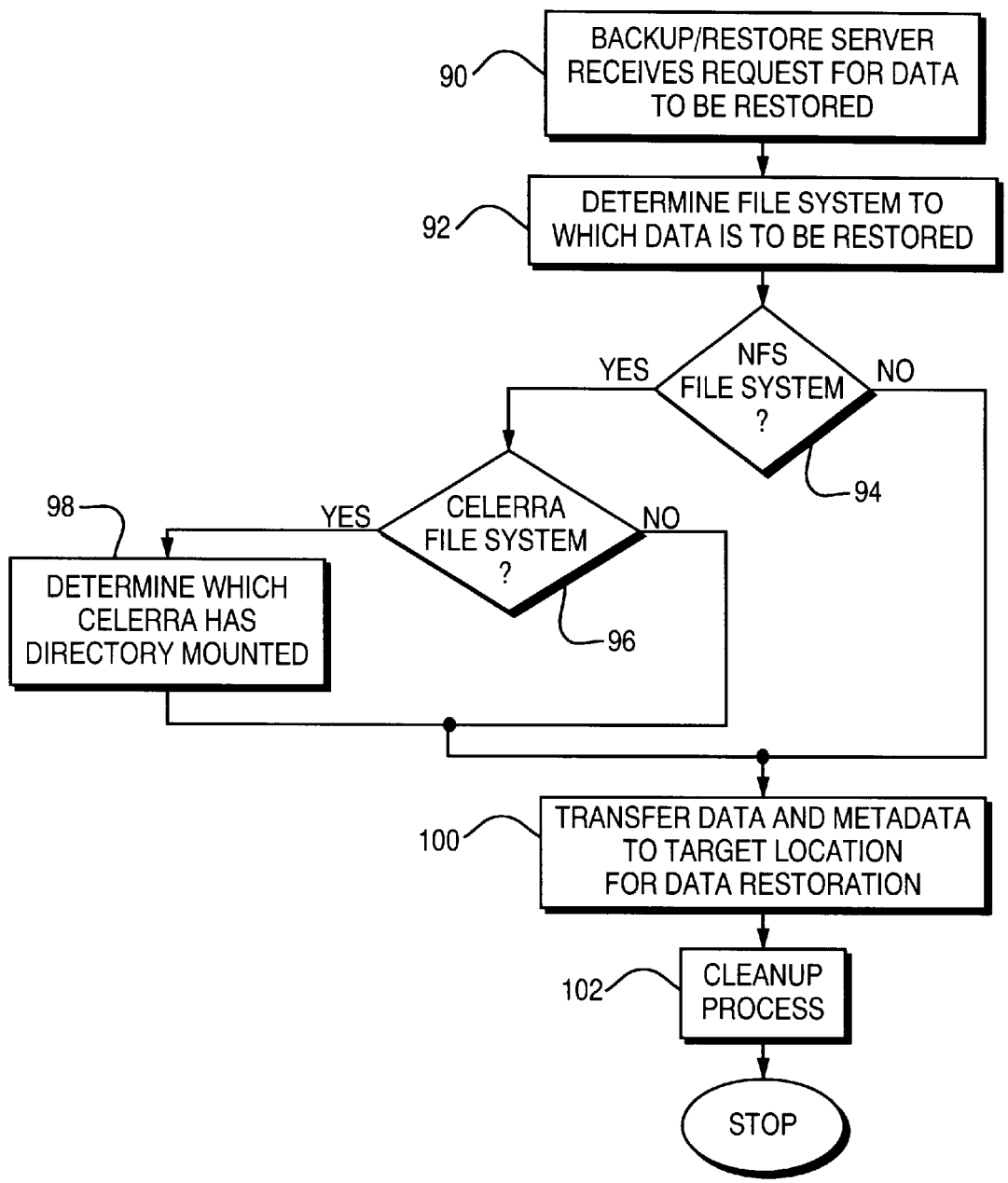
FIG. 6 is a flowchart of an example of an embodiment of a method for performing data restoration in the system of FIG. 1.

Referring now to FIG. 6, shown is a flowchart of the steps of an embodiment for restoring data from the backup/restore server 30 to the storage devices 20a–20c. At step 90, the backup/restore server 30 receives a request for data to be restored. Similar to that as described with FIG. 5, this request to restore data may be made locally from the backup/restore server 30, as by an administrator restoring one or many files. The request received at step 90 may also be submitted remotely, as may be initiated by a host such as 12a or 12b. At step 92, the backup/restore server determines the file system type of a target location to which data is to be restored. Similar to that described at step 52 using operating system function calls, the file system type to which data is to be restored is determined. Other embodiments may have other techniques by which to determine the file system to which data is to be restored.

At step 94, a determination is made as to whether data is being restored to an NFS file system. If a determination is made at step 94 that this is not an NFS file system for data to be restored, control proceeds to step 100.

At step 94, if a determination is made that data is to be restored to an NFS file system, control proceeds to step 96 where a determination is made as to whether this is a Celerra file system. The determination may be made at step 96, for example, using various operating system functions provided as by procedure calls. If a determination is made at step 96 that a Celerra file system is used, control proceeds to step 98 where a determination is made as to which Celerra has the directory mounted for data being restored.

Control proceeds to step 100 where data and metadata are transferred to the target location for data restoration. In this embodiment, the data is restored. Once complete, the metadata is "applied" to the data file by transmitting the metadata to the file server, such as 16a or 16b.

It should be noted that the organization of the data on devices 20a–20c is determined by the file servers, such as 16a and 16b. If the data is written via the network 14, then the file server writes to the disk or other device 20a–20c itself. Alternatively, if the data is written to the devices 20a–20c via the SAN 18, then the file server directs the file system module on the backup/restore server 30 as to where to write the data on the devices 20a–20c. In this particular embodiment, the data and metadata stored on the various devices 20–20c is organized by filename.

At step 102, a clean up process may be performed. This may include, for example, deallocation of various data structures as used in the prior steps for restoration of data and metadata.

It should be noted that the foregoing techniques may also be employed in restoring data to a location other than the storage area from which it was backed up. For example, the data backed up from the storage devices 20a–20c may be restored to storage devices on system 12a rather than the storage devices 20a–20c.

What will now be described in conjunction with FIGS. 7–11 are examples of application programming interfaces or APIs that may be used in performing the various method steps in FIGS. 4, 5 and 6. It should be noted that the APIs described in FIGS. 7–11 are in a "C"-language notation. It should also be noted that each of these APIs which will be described may be used with a backup/restore product, such as EDM. These APIs may be included in a shareable library for use on a backup server, such as 30 included in FIG. 1. This API enables products, such as EDM to provide full and incremental backups/restores of data, such as Celerra data, over a network. Generally, the APIs that are described in following paragraphs may be calls from an agent included in the backup/restore server 30 making remote procedure calls.

It should be noted that in accordance with task allocation to the different agents on the backup/restore server 30 and the files servers, other embodiments may include other APIs. These APIs may be implemented as local procedure calls, or remote procedure calls. Similar to performing I/O operations for data transmission, it may be transparent to the backup and restore agents as to whether these are remote or local procedure calls.

Referring now to FIG. 7, shown is an example of an API that may be used to identify a Celerra file system and return a file handle to reference the particular file system when doing a backup or a restore. The backup agent 36 of the backup/restore server 30 may perform a call to GetCelerraFShandle to identify a Celerra file system on which a particular file or directory exists. It should be noted that in an embodiment, code associated with this API may actually be executed on the backup/restore server 30, the Celerra of interest, such as file server 16a or 16b, or both in accordance with the division of tasks or functions amongst various components in a particular implementation. It should also be noted that an embodiment may also obtain network information, such as file system handles, using network file tables that may be accessed without making a connection to the Celerra or other file system. Thus, an implementation may obtain the information returned via this API without accessing the file system.

The pathname 122 identifies a string which references a file or directory within a Celerra mounted file system of interest. It should be noted that if a file system is not mounted on the host on which this API is directed to, or it is not exported from the Celerra server, this call will fail. In this particular embodiment the failure or success of the call is indicated by the status parameter 128 which may be an integer returned by the API. Another output parameter is the version 124 which may be a pointer to an integer representing the version of this API. Also output is the parameter fshandlep 126 which is a pointer to a handle set by the API. Generally, this handle is used to reference the Celerra file system in subsequent API calls. fshandlep internally maps to a Celerra host name and identifies, for example file server 16a, which is acting as a host for a particular file system upon which the file as specified bypathname, exists.

Referring now to FIG. 8, shown is an example of an API used to obtain file attributes or the various metadata files for a particular data file. The API GetCelerrafilestat includes three parameters. Generally, the call getCelerrafilestat may be an API call that is performed by the backup agent 36 performing, for example, step 74 or 78 of FIG. 5. Collectively, returned by the file server 16a or 16b are all with those metadata attributes associated with a particular file as identified by parameter pathname 134. The first parameter, fshandlep 132 is an input parameter that is previously returned by the call to getCelerraFShandle upon which the particular file as identified bypathname 134 exists. Returned as an output is the parameter attrs 136 which is a pointer to a pointer of a set of attributes represented as a structure in this particular "C" language description. In this particular embodiment, memory associated with the parameter attrs is allocated and filled by the API, as may be executed on the file server 16a. This structure associated with attrs is a representation of the known file attributes of path name and name value pairs. In other words, the different attributes are represented by the name of the attribute as well as the value associated with that attribute. Collectively, the parameter attrs identifies all of the metadata for the various file systems such as may be used by hosts 12a and 12b. This metadata or file attributes are associated with particular file as identified bypathname 134. A status parameter 138 is similar to that status parameter 128 previously described in conjunction with FIG. 7 which represents the success of this API.

Referring now to FIG. 9, shown is an example of an embodiment of an API for setting file system attributes. The call SetCelerraFileStat may be described as the complementary call to the GetCelerraFileStat 130 as previously described in conjunction with FIG. 8. The first parameterfshandlep 142 is a pointer to the particular Celerra file system previously described, as returned by GetCelerraFSHandle 120. The pathname 144 is an input parameter identifying a file or directory within a Celerra mounted file system as referenced byfshandlep, the first parameter. An input parameter is the attrs parameter 146 which sets the file attributes of the file or directory referenced by the pathname in the file system. attrs references an attribute structure or a collective representation of all of the metadata associated with a particular file or directory represented bypathname 144.

Referring now to FIGS. 10 and 11, shown are various APIs as may be used in the cleanup process such as in performing step 64 of FIG. 4 as part of the backup process, or step 102 of FIG. 6 as part of the restoration process. It should be noted in this particular embodiment that the memory allocation and deallocation for the SetCelerraFileStat attrs parameter 146 as described in conjunction with FIG. 9 is performed by the caller. However, the API 150 FreeCelerraAttr may be used to deallocate the attrs parameter 152 as previously allocated by GetCelerraFileStat.

Referring now to FIG. 11, shown is an example of an embodiment of an API used to deallocate memory with regard to the file system handle as previously allocated by the GetCelerraFSHandle call described in conjunction with FIG. 7. The parameter fshandlep 162 is a pointer previously returned by the GetCelerraFShandle API. The FreeCelerraFSHandle call 160 may be viewed as a complementary call which deallocates the memory associated with the file handle identified by fshandlep.

The foregoing describes the technique for use in the network that includes a multi-lingual file system as may be used in the backup and restore processes. This general technique described is an efficient and flexible technique which returns multiple metadata or multiple file attributes associated with a single file with a single API call allowing backup and restoration of data from a single point included in a network. This type of backup technique and restore technique with a multi-lingual file is useful in an embodiment such as previously described in which various file systems have different attributes corresponding to the same data file.

It should be noted that in one particular embodiment of the catalogue as included on the backup/restore server 30, for each data file stored, various file names and associated metadata in accordance with each of the file systems may be stored. Other embodiments may only include a portion of each of the metadata files for each of the file systems, or may only include one set of metadata. Other preferred embodiments may include other variations and combinations of the metadata stored in the catalogue 32. Generally, in this particular embodiment the catalogue 32 may be used for data browsing, for example, as by a user wishing to restore a particular file, a group of files, or directories for restoration or backup by the backup/restore server 30.

Generally, what has been described are techniques to acquire file system attributes in a multi-lingual file system environment as may be used in file backup and restoration processes. With the multi-lingual capability in the description of a system 10 of FIG. 1 in which each of the hosts 12a and 12b may have different file system, when performing a backup and restore operation there is a need to access all of the file attributes of the metadata with one copy of the file data, as may be stored in a common storage area.

A note should be made regarding the file system handle used in this particular embodiment, such as the one obtained at steps 58 and 98. As previously described, the API GetCelerraFSHandle may be used to obtain the file system handle as described in conjunction with FIG. 7. This file system handle may be stored or cached for reuse with files that are located in the same file system when doing a backup or restore. In other words, for all files located in a particular file system, the handle returned by GetCelerraFSHandle may be reused on subsequent calls rather than repeat a call to the API if it is known that other files reside within the same file system as identified by the parameter fshandlep 126 of API 120 GetCelerraFSHandle.

It should be noted that in this particular embodiment that the network 14 may be a LAN for example which operates in accordance with the TCP/IP protocol. Other embodiments may include other types of networks operating in accordance with other protocols.

As previously described, when performing a backup of data from a storage area such as 20a–20c, file operations such as an open, read and close sequence of I/O operations may be performed with regard to a particular file. Similarly, when performing a restoration of data and open, write, close sequence of I/O operations may be performed. These file I/O operations in combination with a single API call to obtain the various metadata files associated with particular data set provide a transparency to the EDM agent as operating in the backup/restore server 30. In other words, the backup and restore processes as managed by the backup/restore server 30 employ gathering of different attributes or meta data associated with a particular file. This technique provides for a centralized backup server which may be done via remote network connections.

The various file attributes are gathered and stored by the file servers 16a and 16b. In this particular embodiment, calls may be made in the Celerra file server's uxfs file system to obtain the various attributes which are collectively packaged together and returned via an API parameter to the backup/restore server 30. Other embodiments may obtain the file attributes corresponding to the metadata using other techniques in accordance with a particular implementation of the multi-lingual file system.

It should be noted that the previously described techniques may be used for both full and incremental backup and restores of data over the network. Generally, whether we are doing a full or incremental backup is a determination that has been made is part of the process known to those skilled in the art of backup and restoring. The flowcharts and techniques described herein may be used with either a full or incremental backup and restore as determined in accordance with various backup and restoration processes.

The foregoing description generally sets forth an embodiment in which the backup and restore agents operate on a backup/restore server using an API to communicate with a file server that includes a metadata service to provide for one or more metadata files associated with a single set of data. The backup and restore operations are generally controlled in this embodiment by agents that are included in the backup/restore server. Services as included in the file server are used by the backup/restore server to backup or restore the necessary data and metadata in accordance with the particular data operation being performed.

It should also be noted that the foregoing description sets forth an embodiment that includes operations and APIs, such as memory clean-up operations for memory deallocation. As known to those skilled in the art, operations such as these and the associated APIs may be omitted from an embodiment without departing from the principles and techniques of the invention.

The foregoing description also sets forth a backup/restore server in the form of a client/server paradigm in which the client is the backup/restore server making requests of the client, such as the file server. In this example, the client may be requesting that data be restored or backed up from storage devices 20a–20c or via another location from the network.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a computer system for providing a plurality of metadata files associated with a data file in a network comprising:
   issuing a request by a client for said data file and said plurality of metadata files from a file storage area;
   obtaining, by a multi-lingual file server, each of said plurality of metadata files describing said data file in accordance with a different file system in a multi-lingual file system, wherein said multi-lingual file server accesses files formatted for access by different operating systems; and
   providing, in response to said request, to said client in a single response said plurality of metadata files;
   and wherein said issuing, said obtaining and said providing are performed using remote procedure calls between said client and said multi-lingual file server.

2. The method of claim 1, wherein said metadata files are transferred using a network connection between said file storage area and said multi-lingual file server supplying the metadata files and said data file is transferred using a different connection that may be characterized as a higher-speed connection than said network connection.

3. The method of claim 2, wherein said data file is remotely transferred from said multi-lingual file server to said client using a second connection that is a direct connection between said file storage area and a requester requesting the data file.

4. The method of claim 3, wherein said metadata files include a first metadata file and a second metadata file, said first metadata file including attributes describing said data file in a first file system used by a first node in said network and said second metadata file including attributes describing said data file in a second file system used by a second node in said network.

5. The method of claim 4, wherein said first file system is a first type of network file system and said second file system is a second type of network file system.

6. The method of claim 4, further including:
storing said plurality of metadata files in a catalogue on a client node in said network which issued said request.

7. The method of claim 4, wherein said plurality of metadata files and said data file are transferred to a target node in said network different from a client node in said network which issued said request.

8. A method executed in a computer system for performing a backup data operation in a network comprising:
receiving a request at a backup server to backup data from a storage area;
transferring, in response to said request, a data file included in a multi-lingual file system to said backup server from a multi-lingual file server, wherein said multi-lingual file server accesses files formatted for access by different operating systems; and
transferring to said backup server, using a single remote procedure call, a plurality of metadata files corresponding to said data file and obtained by said multi-lingual file server, each of said metadata files describing said data file in a different file system included in said network.

9. The method of claim 8, wherein said receiving and said transferring a data file are performed using remote procedure calls.

10. The method of claim 8, wherein said plurality of metadata files are represented in a single parameter included as an output parameter from said single remote procedure calls executed by said multi-lingual file server.

11. The method of claim 8, further including:
storing said plurality of metadata files in a catalogue.

12. The method of claim 11, wherein said catalogue is located on a computer system issuing said request.

13. The method of claim 11, wherein said catalogue is located on another computer system other than a computer system issuing said request.

14. The method of claim 8 further including:
storing said data file on a backup storage device, and storing a portion of said one or more metadata files in a catalogue.

15. The method of claim 14 further including:
storing said plurality of metadata files on said backup storage device with said data file.

16. The method of claim 8, further including:
determining if said data file has been modified since commencing backup of said data file;
if said data file has been modified since commencing backup, performing said transferring said data file again; and
wherein said plurality of metadata files are not transferred until it has been determined that said data file has not been modified since commencing backup of said data file.

17. The method of claim 16, further including:
deallocating memory used as parameters for transferring said plurality of metadata files.

18. The method of claim 16, wherein said file server determines if said data file has been modified by comparing a first portion of said plurality of metadata files prior to commencing backup with a second portion of said plurality of metadata files after said data file has been transferred to said backup server.

19. The method of claim 18, wherein said data file is included in a directory being backed up.

20. The method of claim 19, wherein said data file is part of an incremental backup procedure.

21. The method of claim 19, wherein said data file is part of a full backup procedure.

22. The method of claim 18, wherein said data file is included in a file system being backed up.

23. The method of claim 8, wherein said metadata files are transferred using a network connection between said storage area and said multi-lingual file server supplying the metadata files and said data file is transferred using a different connection that may be characterized as a higher-speed connection than said network connection.

24. The method of claim 8, wherein said data file is remotely transferred from said multi-lingual file server to said client using a second connection that is a direct connection between said storage area and a backup server requesting the data file.

25. A method executed in a computer system for performing a data restoration operation in a network comprising:
receiving a request by a backup server for restoration of a data file from a backup storage area;
transferring said data file to said target location, said target location being at a network location different from said backup storage area; and
transferring a plurality of metadata files associated with said data file from said backup storage area in a single message using remote procedure calls to said target location, each of said plurality of metadata files describing said data file in accordance with a different file system and being previously sent to said backup server from a multi-lingual file server, said data file being included in a multi-lingual file system, wherein said multi-lingual file server accesses files formatted for access by different operating systems.

26. The method of claim 25 further including:
browsing a catalogue included on said backup server for selecting said data file for restoration.

27. The method of claim 25, wherein said request is issued by a first computer system and said target location is a second computer system in which said first and second computer systems are different nodes in said network.

28. The method of claim 25, wherein said request is issued by a first computer system and said target location is a second computer system in which said first and second computer systems are located at a same node in said network.

29. The method of claim 25, wherein said plurality of metadata files are represented as an output parameter included in a remote procedure call.

30. The method of claim 29, further including:
performing memory deallocation of said output parameter.

31. The method of claim 25, wherein said metadata files are transferred using a network connection between a backup server computer system and said multi-lingual file server controlling file access to a mass storage area accessed by multiple nodes included in the network and said data file is transferred using a different connection that may be characterized as a higher-speed connection than said network connection.

32. The method of claim 31, wherein said data file is remotely transferred from said backup server to said multi-lingual file server using a second connection that is a direct connection between a mass storage area accessed by multiple nodes included in the network and said backup server restoring said data file, said multi-lingual file server controlling file access to said mass storage area.

33. The method of claim 25, wherein said plurality of metadata files includes a first metadata file and a second metadata file, said first metadata file including attributes describing said data file in a first file system used by a first node in said network and said second metadata file including attributes describing said data file in a second file system used by a second node in said network.

34. A system for providing a plurality of metadata files associated with a data file in a network comprising:
    machine executable code for issuing a request by a client for said data file and said plurality of metadata files from a file storage area;
    machine executable code for obtaining, by a multi-lingual file server, each of said plurality of metadata files describing said data file in accordance with a different file system in a multi-lingual file system, wherein said multi-lingual file server accesses files formatted for access by different operating systems; and
    machine executable code for providing to said client, in response to said request, in a single response each of said plurality of metadata files;
    and wherein said machine executable code for issuing, obtaining and providing utilize remote procedure calls between said client and said multi-lingual file server.

35. The system of claim 34, wherein said metadata files are transferred using a network connection between said file storage area and said multi-lingual file server supplying the metadata files and said data file is transferred using a different connection that may be characterized as a higher-speed connection than said network connection.

36. The system of claim 35, wherein said data file is remotely transferred from said multi-lingual file server to said client using a second connection that is a direct connection between said file storage area and a requester requesting the data file.

37. The system of claim 36, wherein said metadata files include a first metadata file and a second metadata file, said first metadata file including attributes describing said data file in a first file system used by a first node in said network and said second metadata file including attributes describing said data file in a second file system used by a second node in said network.

38. The system of claim 37, further including:
    machine executable code for storing said plurality of metadata files in a catalogue on a client node in said network which issued said request.

39. The system of claim 37, wherein said plurality of metadata files and said data file are transferred to a target node in said network different from a client node in said network which issued said request.

40. A system for performing a data backup operation in a network comprising:
    machine executable code for receiving a request at a backup server to backup data from a storage area;
    machine executable code for transferring, in response to said request, a data file included in a multi-lingual file system to said backup server from a multi-lingual file server, wherein said multi-lingual file server accesses files formatted for access by different operating systems; and
    machine executable code for transferring to said backup server, using a single remote procedure call, a plurality of metadata files corresponding to said data file and obtained by said multi-lingual file server, each of said metadata files describing said data file in a different file system included in said network.

41. The system of claim 40, wherein said machine executable code for receiving and machine executable code for transferring a data file utilize remote procedure calls.

42. The system of claim 40, wherein said plurality of metadata file are represented in a single parameter included as an output parameter from said single remote procedure call executed by said multi-lingual file server.

43. The system of claim 40, further including:
    machine executable code for storing said plurality of metadata files in a catalogue.

44. The system of claim 43, wherein said catalogue is located on a computer system issuing said request.

45. The system of claim 43, wherein said catalogue is located on another computer system other than a computer system issuing said request.

46. The system of claim 40 further including:
    machine executable code for storing said data file on a backup storage device; and
    machine executable code for storing a portion of said plurality of metadata files in a catalogue.

47. The system of claim 46 further including:
    machine executable code for storing said plurality of metadata files on said backup storage device with said data file.

48. The system of claim 40, further including:
    machine executable code for determining if said data file has been modified since commencing backup of said data file;
    machine executable code for performing said transferring said data file again if said data file has been modified since commencing backup; and
    wherein said plurality of metadata files are not transferred until it has been determined that said data file has not been modified since commencing backup of said data file.

49. The system of claim 48, further including:
    machine executable code for deallocating memory used as parameters for transferring said plurality of metadata files.

50. The system of claim 48, wherein said file server includes said machine executable code for determining if said data file has been modified by comparing a first portion of said plurality of metadata files prior to commencing backup with a second portion of said plurality of metadata files after said data file has been transferred to said backup server.

51. The system of claim 50, wherein said data file is included in a directory being backed up.

52. The system of claim 51, wherein said data file is part of an incremental backup procedure.

53. The system of claim 51, wherein said data file is part of a full backup procedure.

54. The system of claim 50, wherein said data file is included in a file system being backed up.

55. The system of claim 40, wherein said metadata files are transferred using a network connection between said storage area and said multi-lingual file server supplying the metadata files and said data file is transferred using a different connection that may be characterized as a higher-speed connection than said network connection.

56. The system of claim 55, wherein said data file is remotely transferred from said multi-lingual file server to said client using a second connection that is a direct connection between said storage area and a backup server requesting the data file.

57. A system for performing a data restoration operation in a network comprising:
    machine executable code for receiving a request by a backup server for restoration of a data file from a backup storage area;
    machine executable code for transferring said data file to a target location, said target location being at a network location different from said backup storage area; and machine executable code for transferring a plurality of metadata files associated with said data file from said backup storage area in a single message using remote procedure calls to said target location, each of said metadata files describing said data file in accordance with a different file system and being previously sent to said backup server from a multi-lingual file server, said data file being included in a multi-lingual file system, wherein said multi-lingual file server accesses files formatted for access by different operating systems.

58. The system of claim 57 further including:
machine executable code for browsing a catalogue included on said backup server for selecting said data file for restoration.

59. The system of claim 57, wherein said request is issued by a first computer system and said target location is a second computer system in which said first and second computer systems are different nodes in said network.

60. The system of claim 57, wherein said request is issued by a first computer system and said target location is a second computer system in which said first and second computer systems are located at a same node in said network.

61. The system of claim 57, wherein said plurality of metadata files are represented as a parameter included in a remote procedure call.

62. The system of claim 61, further including:
machine executable code for performing memory deallocation of said parameter.

63. The system of claim 57, wherein said metadata files are transferred using a network connection between a backup server computer system and said multi-lingual file server controlling file access to a mass storage area accessed by multiple nodes and said data file is transferred using a different connection that may be characterized as a higher-speed connection than said network connection.

64. The system of claim 63, wherein said data file is remotely transferred from said backup server to said multi-lingual file server using a second connection that is a direct connection between a mass storage area accessed by multiple nodes included in the network and said backup server restoring said data file, said multi-lingual file server controlling file access to said mass storage area.

65. The system of claim 57, wherein said plurality of metadata files includes a first metadata file and a second metadata file, said first metadata file including attributes describing said data file in a first file system used by a first node in said network and said second metadata file including attributes describing said data file in a second file system used by a second node in said network.

66. A system for performing a remote backup operation in a network comprising:
at least two computer systems included in said network, each of said computer systems having a different file system;
a backup computer system for performing backup data operations and having a backup storage device;
a backup agent included in said backup computer system for controlling data backup operations and issuing remote procedure call requests to obtain a data file included in a multi-lingual file system to be backed up to said backup storage device;
a file server system that includes the multi-lingual file system for providing data associated with a data file to be backed up to said backup computer system, wherein said file server system includes a multi-lingual file server that accesses files formatted for access by different operating systems;
a metadata service included in said file server system for responding using remote procedure calls to requests from said backup agent for metadata associated with the data file, said metadata service providing at least two metadata files for the data file being backed up as a parameter included in a first of said remote procedure calls, each of said two metadata files including file attributes corresponding to a different file system used by one of said at least two computer systems; and
a network connection between said backup agent and said metadata service for transmitting said at least two metadata files.

67. The system of claim 66 further comprising: a catalogue storage device that includes a portion of said two metadata files.

68. The system of claim 66 further comprising:
a direct connection between said backup computer system and a storage area network in which said data file and said at least two metadata files are included in said storage area network.

69. The system of claim 66, wherein said direct connection is a fibre channel connection.

70. The system of claim 66, wherein said direct connection is a small computer system interface (SCSI) connection.

71. A system for performing a remote data restoration operation in a network comprising:
at least two computer systems included in said network, each of said computer systems having a different file system;
a backup computer system for performing data restoration operations and having a backup storage device;
a restore agent included in said backup computer system for controlling data restoration operations and issuing remote procedure calls to transmit a data file included in a multi-lingual file system to be restored to a target location, said restore agent providing at least two metadata files for said data file being restored as a parameter included in a first of said remote procedure calls, each of said two metadata files including file attributes corresponding to a different file system used by one of said at least two computer systems;
a multilingual file server that accesses said data file formatted for access by different operating systems;
a metadata service included in said target location for interfacing with said restore agent to receive data transmitted from said restore agent; and
a network connection between said restore agent and said metadata service for transmitting said at least two metadata files.

72. The system of claim 71 further comprising:
a catalogue storage device included in said backup computer system that includes a portion of said two metadata files and may be viewed in selecting data files to be restored from said backup storage device.

73. The system of claim 71 further comprising:
a direct connection between said backup computer system and said target location that is used for transmitting said data file to said target location from said backup computer system.

74. The system of claim 73, wherein said direct connection is a fibre channel connection.

75. The system of claim 73, wherein said direct connection is a small computer system interface (SCSI) connection.

* * * * *